United States Patent [19]

Mech

[11] 3,841,297

[45] Oct. 15, 1974

[54] MACHINE FOR CUTTING BRITTLE MATERIALS

[75] Inventor: Harold W. Mech, Chicago, Ill.

[73] Assignee: Motorola Inc., Franklin Park, Ill.

[22] Filed: July 2, 1973

[21] Appl. No.: 375,575

Related U.S. Application Data

[63] Continuation of Ser. No. 203,657, Dec. 1, 1971, abandoned.

[52] U.S. Cl. .................................. 125/12, 125/21
[51] Int. Cl. ............................................ B28d 1/08
[58] Field of Search ...... 125/21, 12, 16; 51/135 BT, 51/148; 242/47.01, 47.08, 47.09, 45

[56] References Cited
UNITED STATES PATENTS

| | | | |
|---|---|---|---|
| 2,485,895 | 10/1949 | Larsen | 242/45 |
| 2,566,848 | 9/1951 | Morton | 242/45 |
| 3,155,087 | 11/1964 | Dreyfus | 125/21 |
| 3,416,051 | 12/1968 | Pinto | 242/75.51 |

FOREIGN PATENTS OR APPLICATIONS

| | | | |
|---|---|---|---|
| 22,464 | 12/1901 | Great Britain | 242/47.09 |

Primary Examiner—Al Lawrence Smith
Assistant Examiner—Nicholas P. Godici
Attorney, Agent, or Firm—Eugene A. Parsons; Vincent J. Rauner

[57] ABSTRACT

A plurality of pulleys defining a continuous wire path including a wire storage system and a cutting area, with a reversible drive motor connected in the system to periodically reverse and produce a sawing motion in the wire. The various pulleys in the system are canted so that wire entering and leaving the groove in the periphery of each pulley lies in the plane of the pulley to reduce or remove transverse forces on the wire tending to pull the wire out of the groove. A motor connected to a spool supplying new wire to the system is controlled to produce a constant tension in the wire of the system and a motor connected to a spool operating to take up used wire in the system is controlled to maintain a predetermined constant rate of movement of the wire in the system.

13 Claims, 7 Drawing Figures

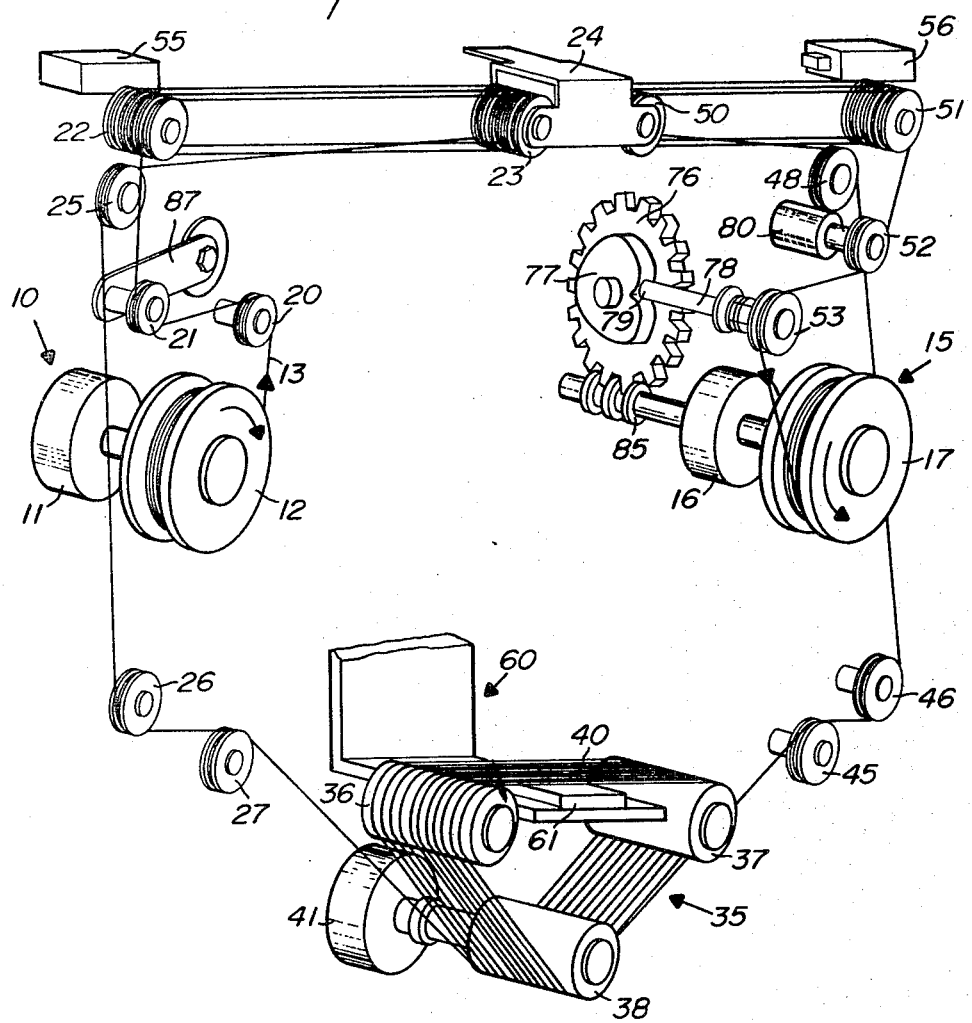
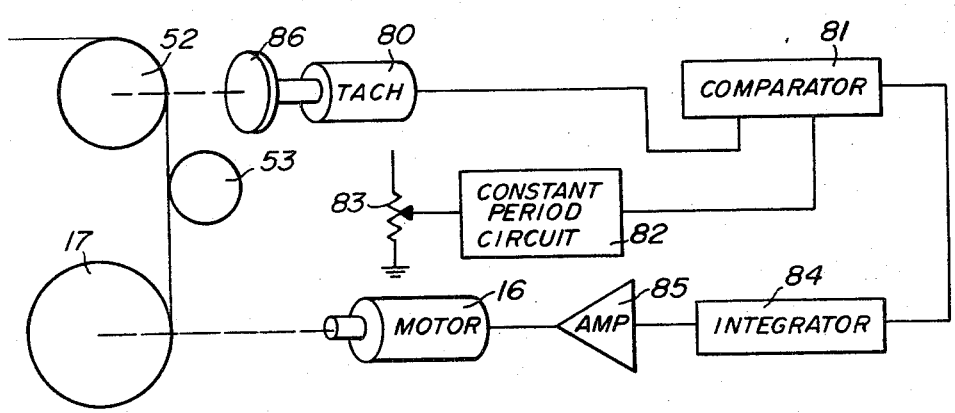

MACHINE FOR CUTTING BRITTLE MATERIALS

This is a continuation, of application Ser. No. 203,657, filed Dec. 1, 1971, now abandoned.

BACKGROUND OF THE INVENTION

1. Field of the invention

A great number of small components, such as semiconductor devices, sensors, piezoelectric devices, crystals, etc. are presently utilized in electronics and many other fields. These components include thin, relatively small pieces of brittle materials which are extremely difficult to cut into the desired shapes. Further, in many instances the material is costly and substantial quantities of the material are wasted during the cutting procedure. The present machine pertains to the sawing of samples of brittle materials, especially crystalline materials such as quartz, ceramics and simple or complex crystals of any kind, and substantially any other materials wherein fine cuts are required.

2. Description of the prior art

In the prior art a variety of saws for brittle materials have been developed wherein a continuous strand of thin, hard wire is guided over a plurality of pulleys to provide a plurality of parallel sections of wire spaced apart laterally a distance equal to the required thickness for the various components. In several of these prior art devices one of the pulleys is driven by a motor which is periodically reversed to reverse the direction of travel of the wires, relative to the material being cut, to provide the structure with a sawing action. For an example of this prior art device, see U.S. Pat. No. 3,155,087, entitled "Machine For Sawing Samples of Brittle Materials", issued to B. A. Dreyfus.

In these prior art devices the wire extends around a plurality of pulleys mounted in parallel on common shafts. The wire, which carries fine particles of cutting material suspended in a slurry, has a tendency to wear out these pulleys extremely fast so that the cost of operating the machine is relatively high. Further, changes in tension and speed of the wire produce inconsistencies in the surface of the material being cut so that the surface must be reworked, to make it flat and smooth, after the cutting operation. This reworking of the material surface greatly increases the cost of the parts being cut.

SUMMARY OF THE INVENTION

The present invention pertains to an improved machine for cutting brittle materials including wire supply and take-up means with a plurality of pulleys defining a continuous wire path therebetween, said pulleys being canted so that wire entering and leaving the groove in the periphery thereof lies substantially in the plane of the pulley, and further including a drive motor in the wire supply controlled to maintain a constant tension in the wire and a drive motor in the take-up means controlled to maintain a constant feed rate of the wire.

It is an object of the present invention to provide an improved machine for cutting brittle materials.

It is a further object of the present invention to provide an improved machine for cutting brittle materials including a plurality of pulleys mounted so that transverse forces on the wires entering and leaving the grooves of the pulleys are substantially zero or have a net effect which is substantially zero.

It is a further object of the present invention to provide an improved machine for cutting brittle materials wherein the wire is maintained at a constant tension and speed.

It is a further object of the present invention to provide an improved machine for cutting brittle materials including means for stopping the machine upon breakage of the wire to prevent damage and injury.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures:

FIG. 1 illustrates semischematically a machine for cutting brittle materials including the improved features;

FIG. 5 is a schematic-block diagram of a system for maintaining constant wire feed rate;

DESCRIPTION OF THE PREFERRED EMBODIMENT

Figure 2:
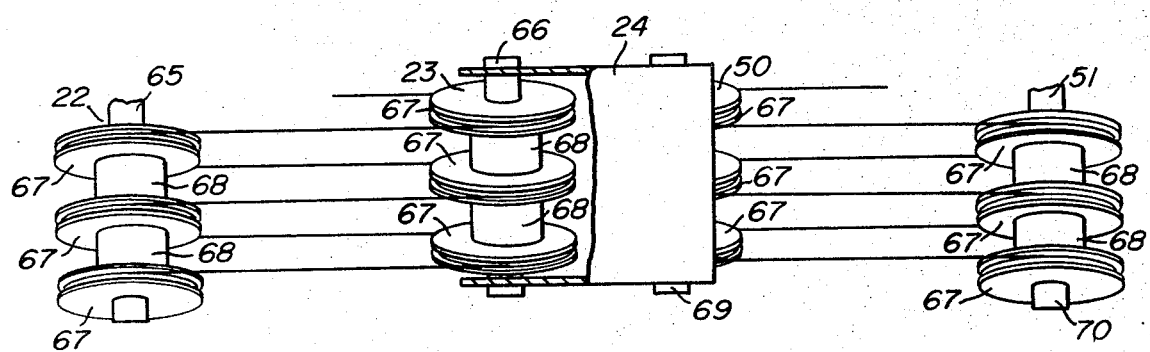
FIG. 2 is an enlarged view in top plan of the storage system illustrated in FIG. 1, portions thereof broken away.

In FIG. 1 the numeral 10 generally designates continuous wire supply means, which in this embodiment includes a drive motor 11 having a spool 12 of new wire 13 affixed to the shaft thereof for rotation therewith. It should be understood that a variety of continuous wire supply means might be devised by those skilled in the art but the motor 11 and spool 12 are illustrated because of their simplicity and ease of control and handling. Take-up means, generally designated 15, include a drive motor 16 and a take-up spool 17 affixed to the shaft thereof for rotation therewith. The drive motors 11 and 16 are generally energized and controlled to maintain a substantially constant movement of the wire 13 therebetween during cutting operations, as will be described in more detail presently. Further, it is desirable to maintain a substantially constant tension on the wire 13 between the spools 12 and 17, which will be described in more detail presently.

The wire 13, extending from the spool 12, is threadedly engaged over two spaced apart wire guide idler pulleys 20 and 21 and extends to a fixedly positioned, rotatably mounted multi-groove pulley assembly 22. A multi-groove pulley assembly 23 is rotatably mounted on a carriage 24, which is in turn mounted for horizontal sliding movements toward and away from the pulley assembly 22. The wire 13 extending to the pulley assembly 22 is engaged over the pulley assemblies 22 and 23 a plurality of times, somewhat in the fashion of a block and tackle, and extends therefrom over a wire guide idler pulley 25. From the idler pulley 25, the wire 13 extends downwardly to a pair of wire guide idler pulleys 26 and 27. The wire 13 extends from the pulley 27 to a web generally designated 35.

Web 35 includes three elongated generally parallel pulleys 36, 37 and 38 rotatably mounted at approximately the apexes of a triangle with an upper side lying approximately horizontally and in an upwardly directed relationship. Each of the pulleys 36, 37 and 38 has a plurality of grooves in the outer surface thereof and the wire 13 extending from the idler pulley 27 is engaged around the pulleys 36, 37 and 38 a plurality of times to form the web 35 defining an enclosed area therebetween. The wire 13 extending between the pulleys 36 and 37 in the upwardly directed flat side of the triangle defines a cutting area 40. It should be understood that other sides of the web 35 might be used for cutting areas but only the upper side is utilized to define cutting area 40 in this embodiment for simplicity of description. The pulley 38 is fixedly attached to the shaft of a drive motor 41, which upon proper energization rotates the pulley 38 and causes the wire 13 of the web 35, and especially the portions in the cutting area 40, to move at a substantially uniform speed.

The wire 13 leaving the web 35 passes across a pair of wire guide idler pulleys 45 and 46. Extending from the idler pulley 46 the wire 13 passes over a wire guide idler pulley 48 to a second pair of multi-groove pulley assemblies 50 and 51, having the wire 13 engaged therearound a plurality of times. The pulley assembly 50 is rotatably mounted on the carriage 24 and the pulley assembly 51 is rotatably mounted in a fixed position adjacent the extreme end of the path of travel for the carriage 24 (the pulley assembly 22 being mounted at the opposite extreme end). The pulley assemblies 50 and 51, having the wire 13 engaged thereover a plurality of times, again form a generally block and tackle type operation. The wire 13 extends from the pulley assembly 51 over a pair of wire guide idler pulleys 52 and 53 to the take-up spool 17 to complete the path thereof. It should of course be understood that the path of the wire 13 illustrated is selected to incorporate the various features of the present machine and those skilled in the art may include a variety of modifications without departing from the scope of this invention.

A first reversing switch 55 is fixedly positioned adjacent pulley assembly 22 and a second reversing switch 56 is fixedly positioned adjacent pulley assembly 51, respectively. The reversing switches 55 and 56 are connected into the energizing circuit for motor 41 to reverse the direction of rotation thereof each time one of the switches 55 or 56 is contacted by the carriage 24. The rotation of motor 41 causes rotation of all of the wire 13 in web 35 and pulls the wire 13 from the pulley assembly 22 or the pulley assembly 51 to move the carriage 24 toward the pulley assembly 22 or the pulley assembly 51, respectively, depending upon the direction of rotation of the motor 41. When the motor 41 has rotated the web 35 sufficiently to cause the carriage 24 to contact the switch 55, the direction of rotation of the motor 41 is reversed by the switch 55 and the direction of movement of the wire in web 35 is reversed. This reversal causes the carriage 24 to begin to move toward the pulley assembly 51 and, upon contact of the carriage 24 with the switch 56, the direction of the motor 41 is again reversed, which reverses the direction of movement of the wire 13 in the web 35. Thus, the direction of movement of the wire 13 in the cutting area 40 is periodically reversed to produce a sawing action.

It should be understood that the wire 13 moves continuously from the spool 12 to the spool 17 at a substantially constant rate even though the direction of movement of the wire 13 in the web 35 is periodically reversed. Thus, new wire is continually supplied to the cutting area 40.

A base, generally designated 60, for mounting a piece of material to be cut, such as the block 61 affixed to the upper surface of the base 60, is movably mounted adjacent the cutting area 40 by means not shown, the base 60 is mounted for vertical movement to apply the block of material 61 to the portions of wire 13 in the cutting area 40. The block of material 61 is affixed to the surface of the base 60 by any convenient means wherein the block of material 61 may be conveniently removed from the surface of the base 60 upon the completion of the cutting thereof. While the present embodiment illustrates the base 60 mounted for vertical movement, it should be understood that the base 60 might be positioned substantially anywhere along the flat open areas of the web 35 and, if desired, more than one base 60 might be utilized in conjunction with the web 35.

Referring to FIG. 2, the carriage 24 with pulley assemblies 22, 23, 50 and 51 is illustrated in top plan. The pulley assemblies 22 and 23 include axles 65 and 66, respectively, positioned in parallel spaced apart relationship each having three pulleys 67 positioned thereon and axially spaced apart by spacers 68. In a similar fashion, the pulley assemblies 50 and 51 include axles 69 and 70, respectively, each having three pulleys 67 positioned thereon and spaced axially apart by spacers 68. The pulleys 67 on each of the axles is approximately transversely aligned with a spacer 68 or an open space adjacent a pulley 67 on the mating axle of the pair of axles 65–66 and 69–70. Further, each of the pulleys 67 is canted relative to the mounting axle (pulleys 67 on mating axles 65–66 and 69–70 being canted in opposite directions) so that the groove in the upper periphery or side of each pulley 67 is approximately aligned with a groove in the upper periphery or side of a pulley 67 on the mating axle and the groove in the lower periphery or side of each pulley 67 is approximately aligned with a groove in the lower periphery or side of a second adjacent pulley 67 on the mating axle. Thus, the portions of wire 13 extending between pulley 67 are approximately parallel and enter the grooves in the pulleys 67 in approximate alignment therewith.

Figure 3:
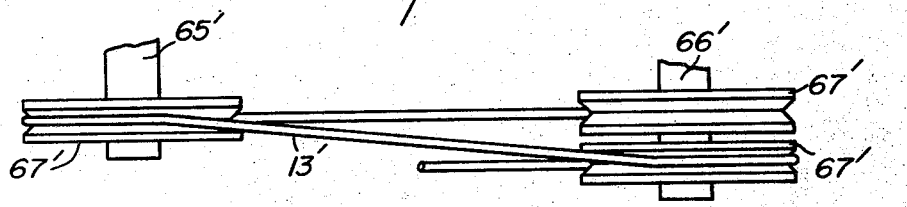
FIG. 3 is a view in top plan of a portion of a prior art machine incorporating pulleys on parallel spaced apart shafts.

Referring to FIG. 3, a portion of a prior art structure is illustrated having a pair of mating (parallel spaced apart) axles 65' and 66' having pulleys 67' mounted thereon. The pulleys 67' are mounted with the planes thereof approximately perpendicular to the mounting axles and with pulleys on mating or opposed axles lying in common planes. A wire 13' extends from the groove in the lower periphery of a pulley 67' on the axle 66' to the groove in the lower periphery of a pulley 67' on the axle 65'. The wire 13' continues around the pulley 67' on the axle 65' and extends from the groove in the upper periphery of a second pulley 67' on the axle 66'. It can be seen that the portions of the wire 13' entering and leaving the grooves in each of the pulleys 67' form an angle with a plane through the pulley 67'. Because of this angle there is a transverse force on the wire tending to pull the wire transversely out of the groove. The groove in the pulley 67' is constructed with a generally V-shaped cross section and the transverse force on the wire causes it to ride higher on the edge of the groove as it approaches the points at which the wire and groove edge are no longer in contact. Because of this rubbing between the wire and the side of the groove in the pulley, the flange or edges of the pulley wear very rapidly and the pulleys must be replaced at a relatively high rate.

Further, because the wire is constantly rolling down the side of the groove as it enters the groove and rolling up the side of the groove as it leaves the groove, a substantial twist is produced on the wire. The twist produced in the wire is retained when the wire reaches the bottom of the groove and is transmitted around the pulley and added to the wire leaving the bottom of the pulley on the opposite side. Thus, if the angles between the plane of the pulley and the wire entering and leaving the pulley differ the twist in the wire will differ and may accumulate to produce a substantial net twist. If the angles between the wire entering and leaving the pulley and the plane of the pulley are equal the twist produced in the wire should be equal but opposite to provide a net accumulation of zero.

Figure 4:
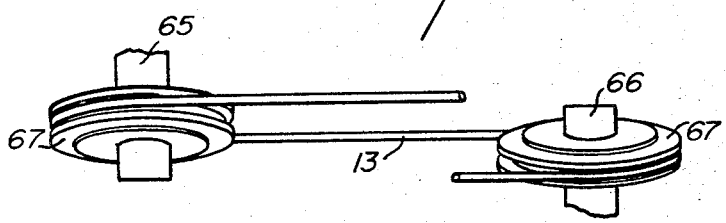
FIG. 4 is a view similar to FIG. 3 of a machine incorporating the present improvements.

Referring to FIG. 4, the axles 65 and 66 of FIG. 1 are illustrated with a single pulley 67 on each for simplicity. The pulleys 67 are mounted so that the wire 13 lies substantially in a plane containing the groove of the pulley 67 on the axle 65 and further lies in a second plane containing the groove of the pulley 67 on the axle 66. Thus, the wire 13 has substantially no tendency to ride on the side of the groove in either of the pulleys 67 so that wear on the side of the pulleys is minimized and substantially no twist is produced in the wire. Thus, the life of the wire 13 and of the pulleys 67 is greatly increased by constructing the machine so that the wire entering and leaving each of the pulleys lies in a plane containing the groove of each of the pulleys or so that the angle between the plane and the wire entering and leaving the pulleys is substantially equal and relatively small.

Referring to FIG. 1, the drive motor 16 has a shaft extending rearwardly therefrom with a worm gear 75 attached thereto. The worm gear 75 is operatively engaged with a circular gear 76 having a cam 77 affixed thereto for rotation therewith. The idler pulley 53 is rotatably mounted for limited axial movement and linking mechanism 78, attached to a cam follower 79 which is engaged with the cam 77, is attached to the pulley 53 to provide axial reciprocating movement thereof in accordance with the rotation of the cam 76. Thus, as the motor 15 rotates the spool 17 and the cam 77, through gears 75 and 76, the pulley 53 is reciprocated axially to produce level winding of the wire 13 on the spool 17. It should be understood that other devices for accommodating large quantities of wire 13 might be devised but the present take-up means 15, including the level wind apparatus, is illustrated for simplicity and ease of construction.

Referring to FIG. 1 and 5, the pulley 52 is attached to the shaft of a tachometer 80 for rotation therewith. The wire 13 engaged with the pulley 52 causes rotation of the pulley 52 which in turn rotates the shaft of the tachometer 80 causing the tachometer 80 to provide an output signal. In the present embodiment, the tachometer 80 is an optical tachometer which produces substantially no torque or drag on the rotation of the pulley 52 and, consequently, on the passage of the wire 13. The tachometer 80 produces a signal at the output, the frequency of which is proportional to the speed of rotation of the tachometer 80. A damping device 86, which may simply be a flywheel or the like, is attached to the input shaft of the tachometer 80 to integrate or smooth out small variations in the rate of movement in the wire 13, which may be produced by the roughness of the wire 13, by the sawing action, etc. While the damping device 86 is not necessary it helps prevent oscillations of the closed loop.

The variable frequency signal from the tachometer 80 is applied to an input of a comparator 81. A controllable constant period of time is produced by a circuit 82, the length of the period of time being controllable by a potentiometer 83. The device producing the controllable constant period of time could be any stable pulse producing device with a constant period of time between pulses, such as a variable oscillator, a multivibrator, etc. The pulses having a constant period of time therebetween are applied to a second input of the comparator 81 and the period of time between pulses is compared to the period of time between cycles from the tachometer 80. The output of the comparator 81 is applied to an integrator 84, the output of which is amplified by an amplifier 85 and applied to the drive motor 16 to control the energization thereof. In the present embodiment the constant period of time produced by the circuit 82 is always less than or equal to the period of time between cycles of the output of the tachometer 80. Thus, as the motor 16 slows down and the wire 13 is drawn onto the spool 17 more slowly, the time period between cycles in the output of the tachometer 80 increases so that the difference between it and the constant time period produced by the circuit 82 increases and the signal from the comparator 81 increases, or the "on" time increases. An increased on time signal from the comparator 81 is applied to the integrator 84 to provide an analog signal proportional to the error. The analog signal is applied through an amplifier 85, which may include SCR's or the like for power output, to the motor 16 to increase the speed thereof and, therefore, increase the rate of feed of the wire 13. The speed or rate of feed of the wire 13 between the spool 12 and the spool 17 is, therefore, maintained relatively constant. By maintaining the rate of feed of the wire 13 relatively constant, the maximum use can be made of the wire 13 and the width of the cuts in the block of material 61 will be maintained more uniform.

Figure 6:
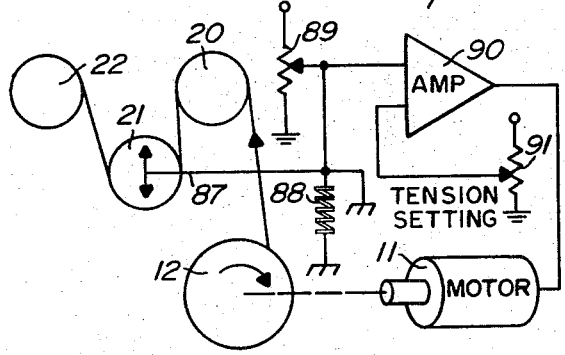
FIG. 6 is a schematic-block diagram of a system for maintaining constant wire tension.

Referring to FIGS. 1 and 6, the pulley 21 is rotatably mounted at one end of an elongated arm 87, the other end of which is pivotally affixed to the frame of the machine or the like. The pulley 21 is engaged with the wire 13 so that the tension in the wire 13 tends to move the pulley 21 upwardly. The arm 87 is biased downwardly into a substantially normal position by a spring 88, which may be a torsion spring or the like. The movable contact of a potentiometer 89 is affixed to the arm 87 for movement therewith and, is positioned at approximately the center of the potentiometer when the arm 87 is in the normal position. A voltage is applied across the potentiometer and a signal is taken from the arm, which signal is a voltage varying in amplitude in accordance with the movement of the arm 87. The signal from the potentiometer 89 is applied to an amplifier 90 where it is compared to a voltage from a preset potentiometer 91. The potentiometer 91 is a tension setting potentiometer which determines the amount of tension in the wire 13. The comparison between the voltage from the potentiometer 89, which is representative of the tension in the wire 13, and the voltage from the potentiometer 91, which is representative of a desired tension in the wire 13, is applied as a control voltage to the motor 11 to vary the torque thereof.

The motor 11 is energized in a direction to produce rotation opposite to the actual direction of rotation of the spool 12. As the difference between the voltage across the potentiometer 89 and the voltage across the potentiometer 91 increases, in either direction, additional control voltage is applied to the motor 11 to increase or decrease the torque thereof and, therefore, to increase or decrease the tension in the wire 13. As the tension in the wire 13 increases the pulley 21 moves upwardly carrying the arm 87 with it and as the tension in the wire 13 decreases the pulley 21 moves downwardly carrying the arm 87 with it. Thus, the apparatus disclosed maintains the tension in the wire 13 at a substantially constant predetermined value. Maintaining the tension in the wire 13 substantially constant increases the life of the wire 13 and improves the uniformity of the cuts in the block of material 61.

Figure 7:
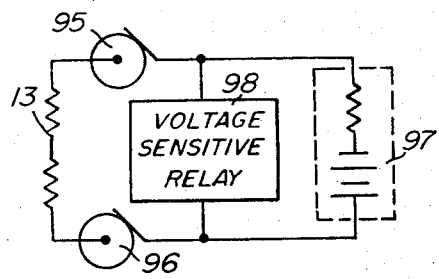
FIG. 7 is a schematic-block diagram of a wire breakage protective system.

Referring to FIG. 7, a wire breakage protection circuit is illustrated in schematic form. The wire 13 is connected between slip rings or other contact surfaces 95 and 96, which may be attached to the spools 12 and 17 or the shafts of the motors 11 and 16. In the present machine, all of the various wire guides and pulleys are constructed of electrical insulating material except the spools 12 and 17. The spools 12 and 17 may be affixed to the shafts of the motors 11 and 16 by insulating bushings and the slip rings or other contact surfaces 95 and 96 are utilized to apply a constant current, from a constant current source 97, to the wire 13. A voltage sensitive relay 98 is connected across the wire 13, by means of the slip rings 95 and 96 to sense the voltage drop across the wire 13. The voltage sensitive relay 98 may include electronic circuitry or mechanical contacts for controlling any or all of the drive motors 11, 16 and 41 as well as any other power to the system. The voltage sensitive relay 98 is adjusted so that a substantial increase in the resistance of the wire 13 activates the relay 98 and stops or shuts down the cutting machine. The relay 98 may be adjusted so that it will only sense a break in the wire 13 or it may be adjusted to sense a substantial reduction in the diameter of the wire 13. For example, if the wire 13 is being moved along the path, defined by the various wire guides and pulleys, at too slow a rate the cutting operation will wear the wire 13 to a smaller diameter than is desired and the resistance of the wire 13 will increase. The relay 98 will operate as an alarm, and in this instance may actually activate an alarm prior to shutting down the cutting machine, to notify the operator that the feed rate of the wire 13 is too slow.

Thus, an improved machine for cutting brittle materials is disclosed wherein the life of the machine and the wire utilized for cutting is substantially increased. Further, the tension and feed rate of the wire are closely controlled to improve the quality of the cutting as well as to maximize the use of the wire. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. An improved machine for cutting brittle materials comprising:
   a. continuous wire supply means;
   b. take-up means for used wire;
   c. a plurality of wire guides defining a continuous wire path between said wire supply means and said take-up means and further defining a cutting area, at least some of said wire guides including pulleys each having at lease one wire receiving groove extending around an outer surface thereof; and
   d. at least some of said wire guides including a plurality of elongated axles mounted in parallel, transversely spaced apart relationship with each axle having pulley means mounted thereon with a plurality of grooves around the periphery thereof, each pulley means on each axle being canted so that grooves in pulley means on one axle and grooves in pulley means on another axle having portions of wire extending therebetween are approximately aligned along the longitudinal axis of the portion of wire extending therebetween.

2. An improved machine for cutting brittle materials as set forth in claim 1 wherein the wire supply means includes a first motor coupled to a spool for applying a torque to said spool and the take-up means includes a second motor coupled to a spool for rotation thereof and having in addition means sensing the tension in the wire and coupled to the first motor for varying the torque of the first motor and maintaining the tension in the wire approximately constant.

3. An improved machine for cutting brittle materials as set forth in claim 2 including in addition means sensing the feed rate of the wire coupled to said second motor for controlling the speed of rotation thereof.

4. An improved machine for cutting brittle materials comprising:
   a. continuous wire supply means including a first motor coupled to a first spool for applying a torque to said first spool;
   b. take-up means including a second motor coupled to a second spool for rotating said second spool and pulling wire from said first spool;
   c. a plurality of wire guides defining a continuous wire path between said wire supply means and said take-up means and further defining a cutting area;
   d. tension means for sensing the tension in the wire and coupled to the first motor for varying the torque of the first motor and maintaining the tension in the wire approximately constant; and
   e. feed rate means for sensing the feed rate of the wire and coupled to said second motor for controlling the speed of rotation of said second motor.

5. An improved machine for cutting brittle materials as set forth in claim 4 wherein the first motor is energized for rotation in a direction the reverse of the actual rotation of the first spool.

6. An improved machine for cutting brittle materials as set forth in claim 4 wherein the tension means for sensing the tension in the wire include means for converting changes in tension into a representative voltage, variable means for generating a variable, predetermined reference voltage representative of a desired tension, and means for comparing the voltage representative of actual tension in the wire to the voltage representative of desired tension in the wire and controlling the torque of the first motor in response to differences therebetween.

7. An improved machine for cutting brittle materials as set forth in claim 4 wherein the feed rate means for sensing the feed rate of the wire include means converting changes in feed rate into a representative frequency, variable means for generating pulses having a variable, predetermined period of time therebetween, and means for comparing periods of time between cycles of the representative frequency to the period of time between generated pulses and controlling the speed of the second motor in response to differences therebetween.

8. An improved machine for cutting brittle materials as set forth in claim 7 wherein the means converting changes in feed rate into a representative frequency include an optical tachometer connected to an idler pulley engaged with the wire in the continuous path.

9. An improved machine for cutting brittle materials as set forth in claim 8 including in addition damping means attached to the optical tachometer for reducing the effect of variations of feed rate having a relatively short duration.

10. An improved machine for cutting brittle materials as set forth in claim 4 wherein the continuous wire path is electrically insulated from the machine and including in addition means for applying a substantially constant current through wire extending along the continuous wire path between the supply means and the take-up means and voltage sensitive means connected to respond to voltage between the supply means and the take-up means and further connected to deactivate the machine upon one of breakage of the wire and reduction of the diameter of the wire below a predetermined size.

11. An improved machine for cutting brittle materials as claimed in claim 1 wherein each of the pulley means includes a separate spool, each spool is mounted in spaced relationship from adjacent spools on the same axle, and each spool is canted separately relative to the mounting axle.

12. An improved machine for cutting brittle materials comprising:
   a. continuous wire supply means;
   b. take-up means for used wire; and
   c. a plurality of wire guides defining a continuous wire path between said wire supply means and said take-up means and further defining a cutting area, at least some of said wire guides including a plurality of elongated axles mounted in parallel, transversely spaced apart relationship with each axle having a plurality of pulleys mounted thereon for independent rotation, each of said pulleys having a wire receiving groove extending around the periphery thereof, and each pulley on each axle being canted so that grooves in pulleys on one axle and grooves in pulleys on another axle having portions of wire extending therebetween are approximately aligned along the longitudinal axis of the portion of wire extending therebetween.

13. An improved machine for cutting brittle materials comprising:
   a. continuous wire supply means;
   b. take-up means for used wire;
   c. a plurality of wire guide defining a continuous wire path between said wire supply means and said take-up means and further defining a cutting area, at least some of said wire guides including pulleys each having at least one wire receiving groove extending around an outer surface thereof and each mounted for rotation on parallel axes; and
   d. each of said pulleys being canted, relative to the rotary axis thereof, so that wire entering the groove forms an angle with a plane in which the groove is contained approximately equal to an angle formed by the plane and the wire leaving the groove.

* * * * *